Figure 1:
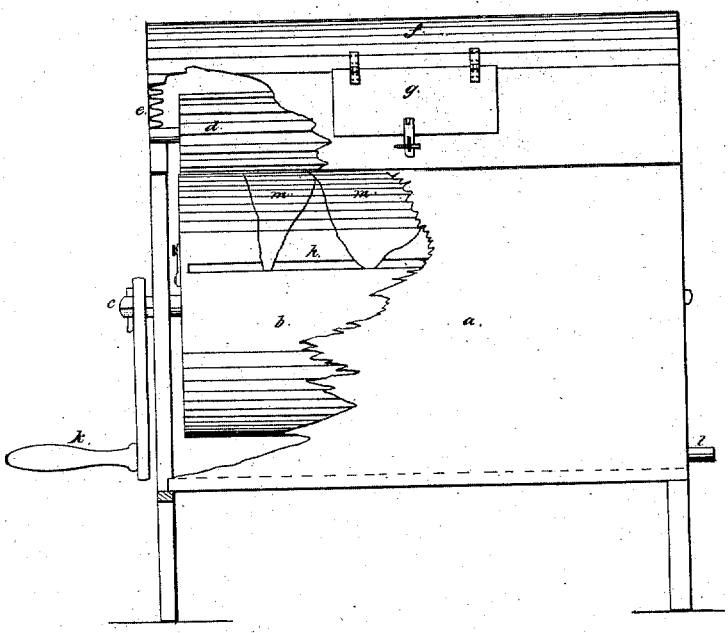
Figure 2:
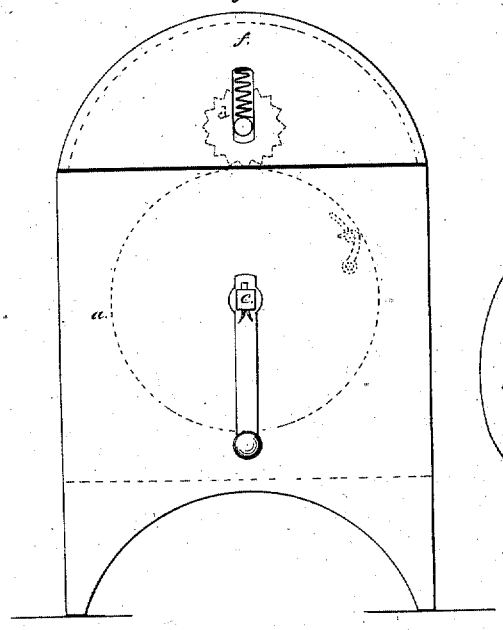
Figure 3:
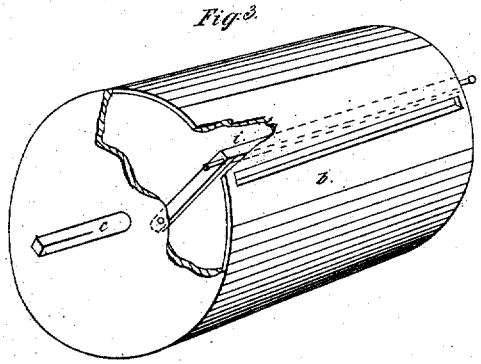

7089X

E. Mayo,

Washing Machine,

Patented May 26, 1832.

N. PETERS, PHOTO-LITHOGRAPHER, WASHINGTON, D. C.

7089X Ebenezer Mayo.
Letters Patent

The Schedule referred to in these Letters Patent and making part of the same containing a description in the words of the said Ebenezer Mayo himself of his improvement in the machine for washing and cleansing cloth & clothes &c, called the wash Drum.

To all persons to whom these presents shall come. Ebenezer Mayo of Hallowell in the county of Kennebeck in the state of Maine Brick-Mason sends Greeting. Be it known that I the said Ebenezer Mayo have invented constructed made and applied to use a new and useful machine for the washing and cleansing of cloth. Clothes and other like substances to be called the wash Drum specified in the words following viz. The said machine consists of a tub or tight box of any convenient form (an oblong square box having been generally used by me as the most convenient form) in which is placed a cylindrical Drum or hollow cylinder, suspended on the sides of the tub or box by an axle fixed firm through its centre hung in the manner of a common grind stone at such a distance above the bottom of the tub or box that the periphery of the drum will dip into a convenient depth of water in the tub or box. Above or contiguous to any part of the outer circumference or surface of this large drum a smaller drum or cylinder with a plain or fluted surface and which may be either hollow or solid. but the latter form is preferred for the sake of its greater weight, is suspended by an axle thro' its centre so that the peripheries of the said larger and smaller drums may just come in contact; and that the cylindrical surface of the larger drum may put in motion the smaller drum when the former is turned round by a crank. A convenient proportion between the diameters of the two drums will be about three or four to one. Springs either horizontal spiral or of any other convenient form are to be so applied to said smaller drum or to the extremities of its axle (and which may be done ...

[illegible]

in many different ways) so that when the cloth or clothes to be
washed shall pass between the peripheries of the two drums the smaller
drum shall rise a little but at the same time be kept pressing
down by the force of the springs so as to squeeze the cloth or clothes
between the outer surfaces or peripheries of the drums. It is a conven
ient construction of the machine to prevent the water from being spa-
tered around in the operation of washing, to have a boxed cover to
match the top of the tub or box. the sides of which should be carried up
to such height as that the top of the cover will be above and cover both
drums; and then the ends of the axle or gudgeons of the smaller drum
may be suspended by or inserted into the side of the boxed cover which
cover may be so made as that the same with the smaller drum
contained in it may be removed from the top of the tub at pleas-
ure and a sliding door, or lid may be placed on an opening
at one end of the box cover for the convenience of turning in water
and placing in the clothes. The cloth or clothes to be washed are to be
suspended or fastened by some small part or extremity of the clothes
while lying on the periphery of the larger drum, by passing such part or
extremity thro' an oblong aperture or slit in the barrel or outer sur
face of the drum and then by bringing close and hard upon it a cross
bar having arms so affixed as to turn vertically on pins or small
bolts on the interior surface of the heads or circular ends of the larger
drum; and securing the cross-bar close down by a button, hasp or
staple of any kind so that the cross bar shall confine the small part
or extremity of the cloth fast in the slit. The exterior surface of the large
drum may be covered by nailing or pinning slats at each end on
the peripheries of the circular heads of drum, leaving small spaces or
slits between them, or the spaces may be closed, except the slits for
inserting the ends of the clothes but the former mode is to be preferred,
This machine is operated by confining one extreme or end of the cloth
to be washed in the slit of the barrel or periphery of the large hollow
drum, or by thus confining, several pieces of cloth or clothes on
different parts of the exterior of the drum, then turning the crank 7089X May 26, 1832 15 of this drum. the clothes are carried round lying on the barrel of the
drum and are passed under the small drum or cylinder sus-
pended in contact with the barrel of the large drum. the springs on
the small drum on the extremities of its axis giving way the clothes
are carried by the rotation of the large drum. between the drums, and
the water being thus squeezed out of them they are passed again
down into the water or suds in the tub. and when the large drum
has gone once round, the clothes are drawn out of the water, and
by continuing the motion. they again pass between the drums,
and so on until sufficiently washed: — Or you may turn
the crank one way for several turns more or less and then by turn-
ing it the other way, the clothes lying on the surface of the large
drum will be alternately reversed. first one side up and then
the other until washed. You may at any time change the posi-
tion of the clothes by confining some other or new part thereof in the
slit of the drum. The water may be drawn off by a cock or aper-
ture in the side or bottom of the tub and may be turned in at
a slide. opening in one end of the boxed cover. In testimony that
this above is a true specification of my said machine as above de-
scribed. I have hereto set my hand and seal the ninth
day of May in the year of our Lord. one thousand eight hundred
and thirty two Witnesses
Ephm Mayo
Saml M Handy Ebenezer Mayo 1118 nos E